(12) United States Patent
DeLong et al.

(10) Patent No.: US 7,897,861 B2
(45) Date of Patent: Mar. 1, 2011

(54) EASY VISUAL TRAINING TEMPLATES TO TEACH PIANO SCALE FINGERING SEQUENCES

(76) Inventors: Mark Lee DeLong, Bellbrook, OH (US); Barbara Louise DeLong, Bellbrook, OH (US); Nathaniel Lee DeLong, Bellbrook, OH (US)

( * ) Notice: Subject to any disclaimer, the term of this patent is extended or adjusted under 35 U.S.C. 154(b) by 0 days.

(21) Appl. No.: 12/393,999

(22) Filed: Feb. 26, 2009

(65) Prior Publication Data

US 2010/0212477 A1 Aug. 26, 2010

(51) Int. Cl.
*G09B 15/00* (2006.01)
(52) U.S. Cl. .................................................... 84/470 R
(58) Field of Classification Search ............... 84/470 R, 84/471 R, 477 R, 478
See application file for complete search history.

(56) References Cited

U.S. PATENT DOCUMENTS

| | | | |
|---|---|---|---|
| 3,395,600 A * | 8/1968 | Leonard | 84/478 |
| 3,678,796 A | 7/1972 | Puopolo | |
| 4,361,070 A | 11/1982 | Huiner | |
| 4,444,083 A | 4/1984 | Apel | |
| 4,969,383 A | 11/1990 | Bezeau | |
| 5,254,008 A | 10/1993 | Dawson | |
| 5,524,522 A | 6/1996 | Hesnan | |
| 6,388,182 B1 * | 5/2002 | Bermudez | 84/477 R |
| 6,936,759 B2 | 8/2005 | Berens | |
| 2004/0231491 A1 * | 11/2004 | Berens | 84/411 R |
| 2007/0000373 A1 * | 1/2007 | Carlson | 84/613 |

* cited by examiner

*Primary Examiner*—Kimberly R. Lockett

(57) ABSTRACT

The present disclosure provides for instruction guide templates for piano keyboard scale fingering for left and right hands and methods of using the guide templates in order to simplify learning the correct fingering sequences of all major and minor scale variations.

6 Claims, 3 Drawing Sheets

Right Hand

Right Hand

EASY VISUAL TRAINING TEMPLATES TO TEACH PIANO SCALE FINGERING SEQUENCES

BACKGROUND OF THE INVENTION

The invention is directed to simple visually coded guide templates for teaching the correct fingering sequence for each hand in all major and minor scale variations, and related musical structures such as arpeggios, on the piano keyboard.

One of the most difficult aspects of learning and playing piano scales is correct fingering for the myriad of major and minor scale key interval sequences. The traditional methods of teaching fingering is instruction by a piano teacher sitting next to the student and providing guidance as to which piano keys to strike with which fingers. There has been a long felt need for a means to instruct students in learning the musical scale belonging to each key signature and their correct finger playing sequences in both hands.

On the piano keyboard, counting all major and the minor scale variations of natural, harmonic, and melodic scales, there are 48 total chromatic scales to master. Key fingering sequences differ not only between left and right hands but are also often uniquely based on the key signature and selected major or minor scale. The deciphering of fingering quickly becomes a complex task beyond the ability of beginner students who cannot yet read music in advanced key signatures. Even experienced students often struggle with the nuances of correct fingering for this myriad of piano scale variations.

The present disclosure provides for useful guide templates and methods for easily learning and practicing all piano scales with correct fingering which are not currently present.

REFERENCES

U.S. Pat. No. 6,936,759; U.S. Pat. No. 4,969,383; U.S. Pat. No. 5,524,522; U.S. Pat. No. 3,678,796; U.S. Pat. No. 4,444,083; U.S. Pat. No. 4,361,070; U.S. Pat. No. 5,254,008; and U.S. Pat. No. 5,5254,008.

SUMMARY OF THE INVENTION

The present disclosure provides for instruction guide templates for piano keyboard scale fingering for left and right hands and methods of using the guide templates in order to simplify learning the correct fingering sequences of all major and minor scale variations.

The guide templates are pre-printed rectangular sheets with instructional fingering guides simply marked as arrows and correct scale fingering numbers covering two octaves, as shown in FIG. 1. The guide templates are predesigned for the unique scale signatures and applicable fingering.

When correctly aligned and inserted upright between the back of the piano keys and the fallboard, the guide templates immediately show not only which keys are played in the scale labeled on the card but also show the scale fingering appropriate to left and right hands. The templates provide a method for students to learn and practice-playing scale sequences both forward and backward. Being able to play scale sequences backwards is a useful aspect for the student, because descending scale fingering is often more difficult to learn and master.

The only knowledge of piano music the student needs to practice the invention is the basic relative locations of the seven major keys (A-G) and their sharp or flat variations on the piano keyboard. Each guide template is aligned by positioning the template so that the left-most arrow/starting finger position lies directly above the piano key labeled on the card. Because of family groupings in scales and shared fingering sequences, guide templates can work equally as well for more than one key signature and these are labeled accordingly. Moreover, the grouping of related key signature fingering sequences on a single guide template directly reinforces and simplifies learning scale fingering for several key signatures at once. For example, the right-hand minor harmonic scales of c#, f#, and g# share identical fingering sequences but on different piano keys, and yet the same template card can be used for all three of these particular scales simply by aligning the template on the different starting notes of each of these scales. The templates encode the correct spatial variation in whole & half steps for the major and minor scale variations by arrow and finger number placement. The easy visual guide templates can be used both by beginner or advanced students for the learning and practice of scale key sequences and correct scale fingering.

DESCRIPTION OF THE EXEMPLARY EMBODIMENTS

Compositions

Figure 1:
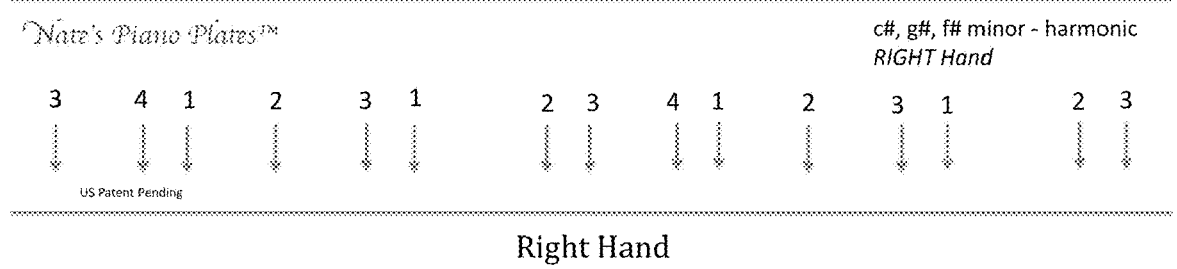
FIG. 1 demonstrates a plan view of a representative guide template, the Template for Teaching c#, g#, and f# Minor Harmonic Scales.

As used herein, the term "guide templates" refer to templates that provide for a visual embodiment of the musical scale structures and scale fingering sequences for the 12 different tones of the piano's chromatic scale. The guide templates can be placed anywhere within visual range of the student. In one embodiment, the guide templates are positioned vertically in the small space between the back of the keys and the piano's fall board cover (when retracted), and are completely out of the way but are easily visible while playing the specific keys marked with the fingering shown.

Guide templates can be composed of any thin material that can be labeled to provide guidance to piano fingering. For example, a guide template can be constructed of paper, plastic, cloth, wood or any composite material. In one embodiment, the guide templates are in the form of laminated rectangular cards printed with easily understood visual instructional fingering guides simply marked as arrows and correct scale fingering numbers covering two octaves.

On a piano keyboard, twelve tones are played on seven white and five black keys in each octave spanning a standard piano's 88 keys. Although the piano keyboard provides more surface strike area to the white keys, the center-to-center spacing between all key centers is a constant distance of approximately 9/16". The guide template provides visual guidance on how to sequentially play the correct tone intervals with correct fingering along this center-to-center key spacing, a predetermined order of half- and whole-step musical tones. The guide templates organize key signatures into family groups defined by common scale fingering order. Left and right hand fingering sequences are independent of one another, and the fingering order differs between hands for different scales. The constant center-to-center key spacing on a piano keyboard means that the guide templates work in any octave. The student can place the guide templates so they are positioned relative to the piano keys A through G, and their half-step variations of sharps and flats.

As used herein, the term "fingering" refers to the choice of which fingers and hand positions to use when playing certain instruments, for example, the piano. Fingering, in this context, is the choice of which finger to use for which key, for each note.

Methods of Use

Table 1 lists 48 unique guide templates required to cover the correct fingering sequences for all the major and minor scale variations (natural, harmonic, and melodic) in both hands. The fingering sequences are listed, by convention, as finger number (from 1 to 5) and play order from left-to-right, ascending the scale. Three different templates exist for each of the three minor scale variations—natural, harmonic, and melodic. In the case where there are more fingering exceptions in the right hand, the guide templates provide for these variations. In one embodiment, the guide templates are printed on 48 separate pieces. In another embodiment, the guide templates are printed on both sides of the guide templates resulting in the printing of 24 double-sided cards that include all the fingerings listed in Table 1.

TABLE 1

Compilation of Unique Guide Templates for Major & Minor Scales (Natural, Harmonic, and Melodic)

| Unique Guide Template # | Hand | Fingering Sequence Family | Scales Labeled on Guide Template |
|---|---|---|---|
| 1 | LEFT | 54321321 | C, G, D, A, E, F Major |
| 2 | RIGHT | 12312345 | C, G, D, A, E Major |
| 3, 4, 5 | LEFT | 54321321 | a, e, d, g, c, f minor |
| 6, 7, 8 | RIGHT | 12312345 | a, e, d, g, c minor |
| 9, 10, 11 | RIGHT | 12341234 | f minor |
| 12 | LEFT | 43214321 | B Major |
| 13 | RIGHT | 12312345 | B Major |
| 14, 15, 16 | LEFT | 43214321 | b minor |
| 17, 18, 19 | RIGHT | 12312345 | b minor |
| 20 | LEFT | 43213214 | F# (G-flat) Major |
| 21 | RIGHT | 23412312 | F# (G-flat) Major |
| 22 | RIGHT | 12341234 | F Major |
| 23 | LEFT | 32143213 | Bb, Eb, Ab, Db (C#) Major |
| 24 | RIGHT | 41231234 | Bb Major |
| 25 | RIGHT | 31234123 | Eb Major |
| 26 | RIGHT | 34123123 | Ab Major |
| 27 | RIGHT | 23123412 | Db (C#) Major |
| 28, 29, 30 | RIGHT | 34123123 | f#, c#, g#(A-flat) minor |
| 31, 32, 33 | LEFT | 43213214 | f# minor |
| 34, 35, 36 | LEFT | 32143213 | c#, g# (A-flat) minor |
| 37, 38, 39 | RIGHT | 31234123 | d# (e-flat) minor |
| 40, 41, 42 | LEFT | 21432132 | d# (e-flat) minor |
| 43, 44, 45 | RIGHT | 41231234 | b-flat (a#) minor |
| 46, 47, 48 | LEFT | 21321432 | b-flat (a#) minor |

In addition to these principal 48 templates, there are 3 special case fingering exceptions not shown in the melodic minor scales of f# minor (right hand ascending: 34123421), c# minor (right hand ascending: 34123412), and Ab (g#) minor (left hand descending: 34123123). These additional fingerings are included on three additional guide templates, bringing the total number of templates to 51.

Figure 3:
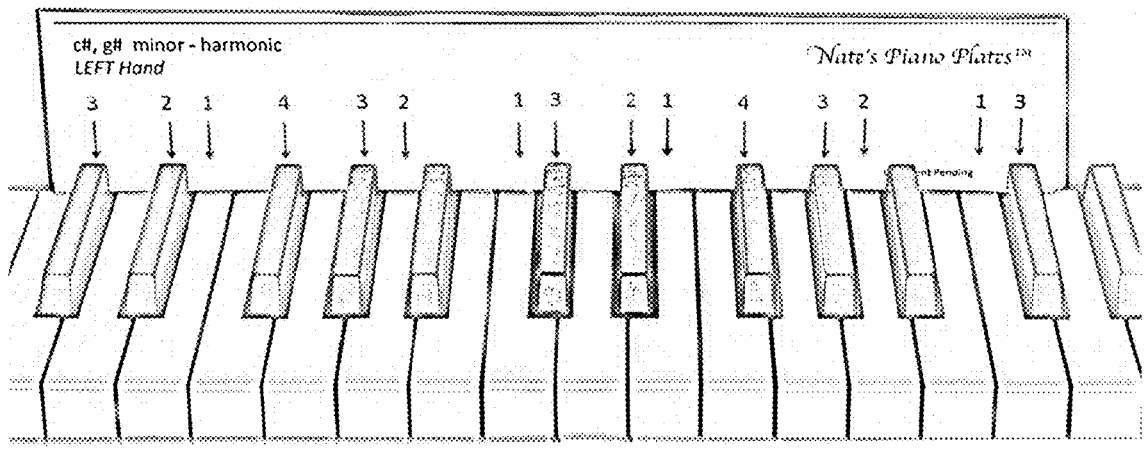
FIG. 3 shows a Sample Template Printed to Correct Scale and Placed on the Piano Keyboard to Teach the c# or g# Minor Harmonic Scales for the Left Hand

In using the guide templates, the player chooses the guide template of interest and then places the guide template vertically in the space between the back of the keys and the retracted fall board cover. To play the major or minor scale variation labeled on the guide template, the student slides the template left or right along the keyboard until the left-most arrow aligns with the first note of the key signature. For example, to correctly align a guide template marked for the A-minor harmonic scale, the student slides the template until the left-most arrow lies directly above any "A" key on the piano keyboard. For an Example, see FIG. 3. The student then plays those indicated keys marked by arrows using the hand and finger number sequence labeled above the arrows.

Figure 2:
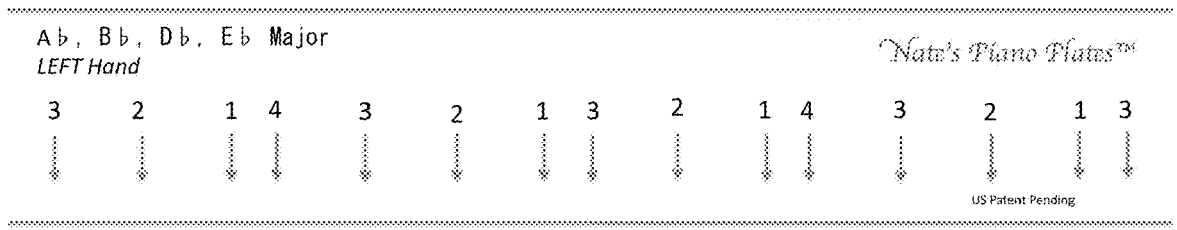
FIG. 2 demonstrates a plan view of a representative guide template, the Template Layout for Teaching Ab, Bb, Db, and Eb Major Scales, Left Hand.

Because scale fingering instructions differ between left and right hands, the guide templates are printed and clearly marked accordingly for use with only the left or right hands. See FIG. 1 and FIG. 2.

What is claimed is:

1. A plurality of guide templates comprising numbered markings spaced from one another at intervals corresponding to a major or minor scale intervals and ordered according to a Fingering Sequence Family existing from one physical piano key to another physical piano key on a piano keyboard, wherein the markings above arrows pointing to the keys to be depressed indicate the correct choice of which finger to use for which key, for each note.

2. The guide templates of claim 1 wherein the major and minor scale markings span the complete set of 12 pitches of the chromatic scale on the piano keyboard.

3. The guide templates of claim 1 wherein there are 15 key markings on each template spanning two octaves and indicating 15 note locations on a keyboard and their correct fingering sequence for key signatures marked on the template.

4. The guide templates of claim 1 wherein the fingering sequence for arpeggios in each key signature and scale type are marked.

5. The guide templates of claim 1 wherein the major and minor scale markings span the complete set of non-chromatic major and minor scales on the piano keyboard, with at least the pentatonic scale with five pitches per octave.

6. A method of teaching piano scale fingering sequence order, the method comprising:
choosing a guide template corresponding to a Fingering Sequence Family for a major or minor scale and a left or right hand;
positioning the guide template;
striking piano keys in an exact fingering sequence indicated by guide template numbered markings;
the guide template numbered markings ranging from 1 to 5 inclusive and corresponding relative to a fingering sequence for left and right hands.

* * * * *